April 19, 1927.

A. E. RAQUÉ ET AL 1,625,281

COMBINED SPEED REGULATING AND MIXING VALVE

Filed Aug. 9, 1920      2 Sheets-Sheet 1

INVENTORS
Arthur E. Raqué and Philip E. Raqué
BY
Conrad A. Dietrich
their ATTORNEY.

Patented Apr. 19, 1927.

1,625,281

UNITED STATES PATENT OFFICE.

ARTHUR E. RAQUÉ AND PHILIP E. RAQUÉ, OF JERSEY CITY, NEW JERSEY.

COMBINED SPEED REGULATING AND MIXING VALVE.

Application filed August 9, 1920. Serial No. 402,464.

Our invention relates to improvements in means for controlling or regulating the speed of motor vehicles, and the same has for its object to provide a device which will automatically control both the character and the volume of the explosive mixture in accordance with the variation in the speed of the engine.

Further, said invention has for its object to provide a device which is positively driven by the engine, by means of which the requisite amount of fuel will be automatically supplied to the engine for all speeds ranging from minimum to maximum.

Further, said invention has for its object to provide a device adapted to be interposed between the carbureter and the engine by means of which the fuel passing therethrough will be thoroughly agitated and broken up and its combustibility improved before the same enters the engine cylinders.

Further, said invention has for its object to provide a device in which both the quality and the volume of the explosive mixture is controlled by the centrifugal action of a rotary, longitudinal movable member which is positively driven by the engine which it controls.

Further, said invention has for its object to provide a simple and efficient device adapted to be interposed between the carbureter and the engine, whereby the explosive mixture will be mechanically agitated, and which will also serve to throttle the flow of the fuel after the engine has acquired a predetermined speed.

Other objects will in part be obvious and in part be pointed out hereinafter.

To the attainment of the aforesaid objects and ends our invention consists in the novel details of construction, and in the combination, connection and arrangement of parts hereinafter more fully described and then pointed out in the claims.

In the accompanying drawings forming part of this specification, wherein like numerals of reference indicate like parts.

Figure 1:
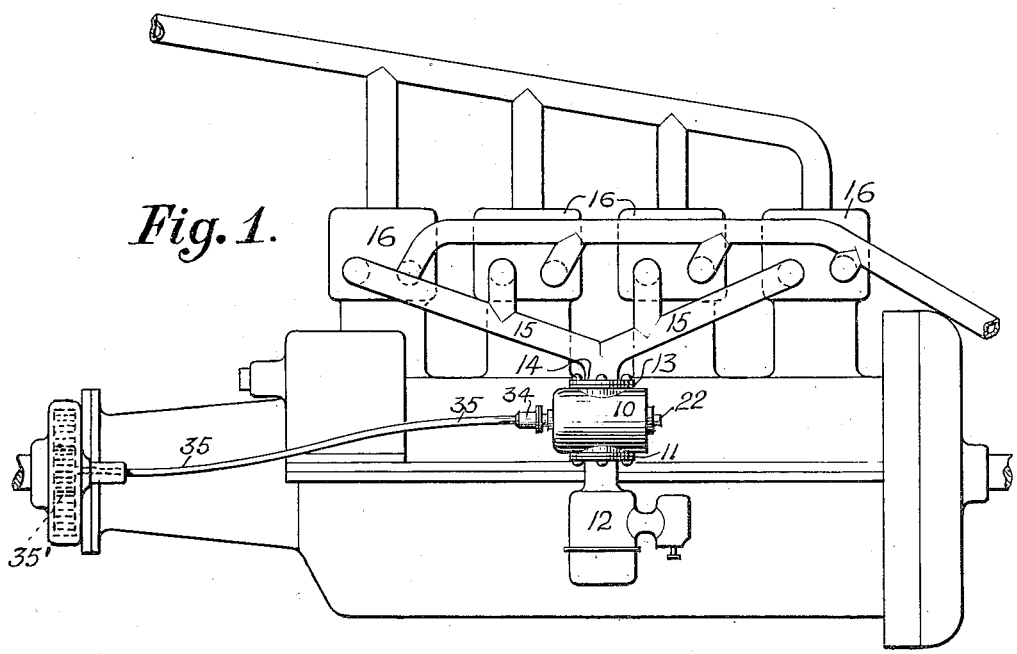
Figure 1 is a side elevation of an internal combustion engine having applied thereto one form of regulating and mixing valve constructed according to, and embodying our said invention.
Figure 2:
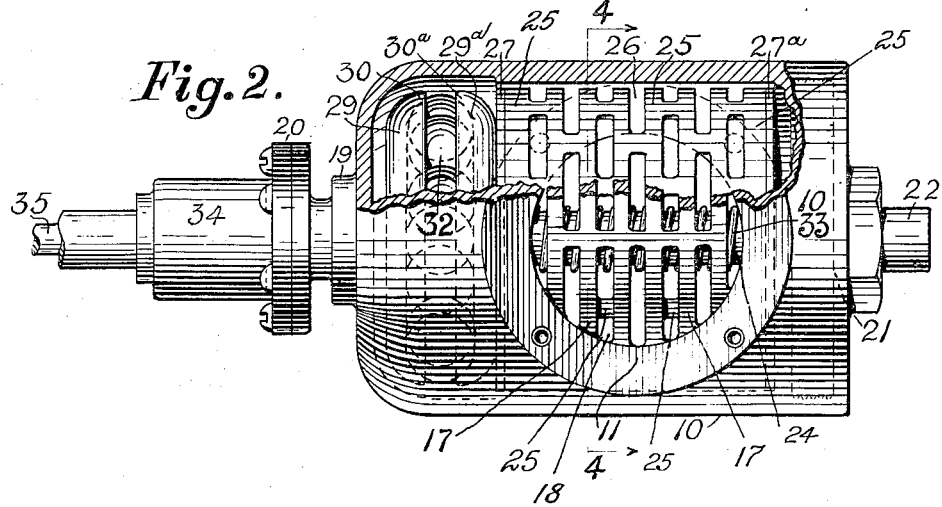
Fig. 2 is a side elevation, partly broken away and in section of the regulating and mixing valve detached from the engine.
Figure 3:
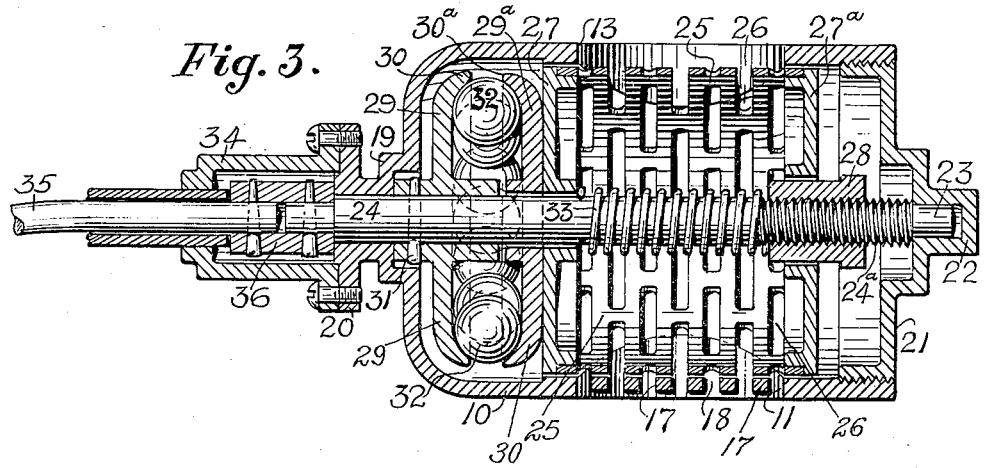
Fig. 3 is a central, longitudinal section thereof.
Figure 4:
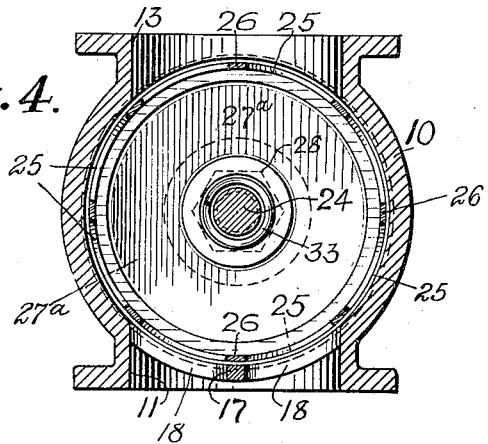
Fig. 4 is a transverse section on the line 4—4 of Fig. 2.

In said drawings 10 designates a casing having a flanged inlet 11 at one side adapted for connection to a carbureter 12, and a flanged outlet 13 at its opposite side, adapted for connection with the flanged end 14 of the intake manifold 15 of an internal combustion engine 16.

The casing 10, which is preferably made cylindrical in form, is provided at its inlet 11 with a perforated portion 17 whose oblong circumferential openings 18 are arranged parallel to each other and to the transverse axis of the casing 10.

One end of the casing 10 is closed and provided with a tubular portion 19 terminating in a flanged end 20, and the opposite end of said casing 10 is screw-threaded to receive a cap 21 having a central socket 22 therein to receive the reduced end 23 of a spindle or shaft 24 whose other end extends through the tubular portion 19 at the opposite end of the casing.

25 denotes a hollow, cylindrical member having oblong circumferential openings 26 therein arranged in parallelism, and corresponding with and adapted to register with the oblong openings 18 in the perforated portion 17 of the inlet 11 of the casing 10.

The hollow cylindrical member 25 is provided at its opposite ends with heads 27, 27ª, which are secured thereto. The head 27 loosely engages the spindle or shaft 24, while the head 27ª loosely engages an adjusting nut 28 working upon the threaded portion 24ª of the spindle or shaft 24.

Upon the portion of the spindle or shaft 24, intermediate the closed end of the casing 10 and the head 27 of the cylindrical member 25, are disposed a pair of discs 29, 29ª having their outer edges 30, 30ª, respectively, curved or inclined inwardly towards each other. The disc 29 is fixed upon the shaft 24 by a pin 31, while the disc 29ª is loosely disposed upon said shaft 24. 32 denote balls confined between the discs 29, 29ª.

33 denotes a spring disposed about the shaft 24 intermediate the inner side of the disc 29, and the inner end of the adjusting nut 28.

The spring 33 and adjusting nut 28 serve to hold the discs 29, 29ª and the interposed balls 32, which jointly form a centrifugal governor, under proper tension, and to maintain the hollow, cylindrical member 25 in projected position so that the circumferential openings 26 therein shall normally coincide or register with the corresponding openings 18 in the inlet portion 11 of the casing 10.

Upon the flanged end 20 of the casing 10 is secured a housing 34 into which extends one end of a shaft 35 which is secured by a coupling 36 to the end of the shaft or spindle 24. The shaft 35, which may be either rigid or flexible, serves to transmit rotary motion from a suitable source of power by gearing 35' to the hollow cylindrical member 25, and to the centrifugal governor comprising the discs 29, 29ª and the interposed balls 32.

The operation of the device is as follows:

When the engine is in motion power will be transmitted from the engine shaft by the gearing 35' and the shaft 35 to the shaft 24 and cause the member 25 and the centrifugal regulator comprising the discs 29, 29ª and balls 32 to revolve within the casing 10. The speed with which said parts rotate being in accordance with the speed of the engine 16. As the said parts 25, 29ª and confined balls 32 are rotated, the centrifugal force will tend to cause the balls 32 to move outwardly and in so doing, by their engagement with the inclined edges 30, 30ª of the discs 29, 29ª, cause the movable disc 29ª to be moved away from the fixed disc 29 and simultaneously move the cylindrical member 25 outwardly against the opposition of the spring 33. As the said member 25 is moved longitudinally upon the shaft 24, the circumferential openings 26 therein will gradually pass out of register with the corresponding openings 18 in the perforated portion 17 of the inlet 11 of the casing 10, and in so doing eventually prevent the passage of the explosive mixture from the carbureter 12 to the intake manifold 15. As soon as the speed of the engine is again reduced, which results in a decrease in the number of revolutions per minute of the shaft 24 and the parts actuated thereby, the member 25 will again be retracted, due to the expansion of the spring 33, and cause the circumferential openings 26 therein gradually to come into register again with the corresponding openings 18 in the perforated portion 17 of the casing. When the said openings 18 and 26 are again wholly or partly in register, fuel may again pass from the carbureter 12 to intake manifold 15. The volume and character of the mixture passing from the carbureter to the engine will depend upon the speed of the engine, and its variations, and also upon the predetermined maximum speed for which the device is set by regulation of the adjusting nut 28 and the spring 33 controlled thereby.

It is to be noted that the explosive mixture delivered by the carbureter to the casing 10 is thoroughly agitated and cut up by the rotary movement of the perforated member 25 as long as said mixture passes through the device, and as a result a completely mixed explosive charge of improved combustibility will be supplied to the engine.

Further, it is to be noted that the device may be readily adjusted to effect the throttling of the engine at any predetermined speed by merely regulating the tension of the spring 33 by the adjusting nut 28.

Having thus described our said invention what we claim and desire to secure by Letters Patent is:

1. A device of the character described comprising a casing having inlet and outlet openings, a hollow member rotatably mounted in said casing and movable axially; said member having spaced openings therein sufficiently close together whereby to normally permit of the continuous flow of fuel through said inlet opening and out through said outlet opening as said hollow member is continuously rotated, means on said casing facing said hollow member and serving to control the effective area of the openings therein as the same is moved axially, and means for moving said hollow member axially to control the flow of fuel through said device, substantially as specified.

2. The combination with a combustion engine and a carbureter, of a casing interposed between the same and having an inlet opening and an outlet opening therein, a hollow member rotatably mounted within said casing and movable axially therein; said member having circumferentially arranged openings therein to normally permit of the continuous passage of fuel from said carbureter through said inlet opening and said outlet opening to said engine, automatic speed responsive means for moving said member axially, and means across an opening aforesaid in said casing for obstructing the openings in said member when the latter is axially displaced, whereby the supply of fuel to said engine is varied in accordance with the speed, substantially as specified.

3. A device of the character described comprising a casing having inlet and outlet openings at spaced portions thereof, flanges around said openings whereby the device may be interposed between and connected to the carbureter and intake manifold of a combustion engine, a shaft rotatably mounted within said casing, a hollow member mounted within said casing for rotation with said shaft and for movement axially thereof, said member having circumferential openings therein to normally permit continuous flow of fuel through said casing, a governor mounted within said casing upon said shaft for moving said member axially, and a grating associated with an inlet and outlet opening for varying the effective area of the openings in said member upon axial displacement thereof, substantially as specified.

4. A device of the character described comprising a casing having inlet and outlet openings, a hollow member rotatably mounted in said casing and movable axially; said member having circumferential rows of spaced openings therein arranged whereby to permit fuel to normally continually pass thereby through said inlet opening and out through said outlet opening, a centrifugal governor for moving said member axially, and means arranged over an inlet and outlet opening and facing said member whereby said openings therein are obstructed when said member is moved axially; said last named means and said member normally co-acting to agitate the fuel as the same passes through said casing, substantially as specified.

5. A device of the character described comprising a casing having an inlet and an outlet, a shaft rotatably mounted within said casing, a hollow member mounted within said casing upon said shaft and axially movable therealong; said member having circumferential openings therein to normally permit continuous flow of fuel through said casing, and a centrifugal member mounted within said casing upon said shaft and consisting of a pair of discs having converging edges, one disc being axially movable along said shaft and frictionally engaging said member, and balls interposed between said discs and retained in place by said edges, whereby upon variations of speed said member is actuated to vary the effective area of the openings therein, a spring for normally retaining said member in position, and means for adjusting said spring, substantially as specified.

6. A device of the character described comprising a casing having an inlet and an outlet, the same including a plurality of rows of elongated transverse openings, a shaft rotatably mounted within said casing, means for connecting said shaft to a source of power, a hollow cylindrical member having closed ends and disposed on said shaft to rotate therewith and movable axially thereof, said member having circumferential rows of elongated openings therein adapted to register with said transverse openings, a centrifugal governor upon said shaft comprising a retaining disc fixed to said shaft, a cooperating retaining disc adjacent to said member and axially movable therewith along said shaft, weights loosely disposed intermediate said discs, adjusting means disposed upon said shaft, and a spring disposed upon said shaft between said member and said adjusting means, substantially as specified.

7. A device of the character described comprising a casing having an inlet opening and an outlet opening therein, means associated with each of said openings whereby the device may be interposed between the carbureter and intake manifold of an internal combustion engine, a spindle rotatably mounted within said casing, means disposed within said casing between said inlet and outlet openings for controlling the quantity of fuel passing through said openings, and a governor disposed within said casing adjacent to said controlling means, actuated by said spindle, and serving to vary the position of said controlling means upon variation in speed of said spindle, whereby the quantity of fuel flowing through said casing is controlled in accordance with the speed, substantially as specified.

ARTHUR E. RAQUÉ.
PHILIP E. RAQUÉ.